United States Patent [19]

Buck

[11] Patent Number: 4,940,476
[45] Date of Patent: Jul. 10, 1990

[54] SOOT FILTER

[75] Inventor: Alfred Buck, Nagolder St. 32, D-7407 Rottenburg 3, Fed. Rep. of Germany

[73] Assignee: Alfred Buck, Rottenburg, Fed. Rep. of Germany

[21] Appl. No.: 358,377

[22] PCT Filed: Sep. 21, 1988

[86] PCT No.: PCT/DE88/00586
§ 371 Date: May 17, 1989
§ 102(e) Date: May 17, 1989

[87] PCT Pub. No.: WO89/02976
PCT Pub. Date: Apr. 6, 1989

[30] Foreign Application Priority Data

Sep. 22, 1987 [DE] Fed. Rep. of Germany ....... 3731766

[51] Int. Cl.$^5$ .............................................. B01D 46/00
[52] U.S. Cl. .......................................... 55/486; 55/520; 55/523; 55/DIG. 30
[58] Field of Search ................ 55/486, 487, 523, 520, 55/DIG. 30; 502/439

[56] References Cited

U.S. PATENT DOCUMENTS

| 2,994,435 | 5/1958 | Moore | 210/484 |
| 3,780,872 | 12/1973 | Pall | 55/525 |
| 3,869,267 | 3/1975 | Gaylor | 55/492 |
| 4,444,574 | 4/1984 | Tradewell | 55/DIG. 30 |
| 4,478,618 | 10/1984 | Bly et al. | 55/314 |

FOREIGN PATENT DOCUMENTS

| 0230579 | 8/1987 | European Pat. Off. . |
| 3007639 | 9/1981 | Fed. Rep. of Germany . |
| 3007642 | 9/1981 | Fed. Rep. of Germany . |
| 3545762 | 7/1987 | Fed. Rep. of Germany .... 55/DIG. 30 |
| 1268493 | 6/1961 | France . |

Primary Examiner—Bernard Nozick
Attorney, Agent, or Firm—Frishauf, Holtz, Goodman & Woodward

[57] ABSTRACT

A soot filter for Diesel engines has a housing (2), in which filter material (11) of mineral fibers or yarns is arranged on a support (7). To prevent the filter material from losing its three-dimensional structure necessary for the filtration in the event of yarn breakage, it is formed at least partly or completely of knitted fabric (12), which maintains its internal coherence in the vicinity of individual loops even in the event of yarn breakage because of the interlacing of the yarns in the adjacent loops.

26 Claims, 9 Drawing Sheets

SOOT FILTER

FIELD OF THE INVENTION

The invention relates to a soot filter, and more particularly to a soot filter for exhaust gases from Diesel engines.

BACKGROUND

In the periodical "Der Nahverkehr" ["Local Traffic"], No. 4, 1986, a soot filter of this generic type is described under the headline "Wickelru filter für Stadtomnibusse in der Erprobung im Verkehrsbetrieb" ["Wound Soot Filter for City Buses Tested in Traffic"]. The soot filter contains a number of tubes in a housing, which are closed at one, and at the other end are welded in gas-tight fashion into a perforated plate that is inserted in a sealed manner into the housing of the soot filter.

The tubes are perforated at their circumference and serve as supports for ceramic yarn, which is wound onto the tubes in the form of cylindrical cross-wound bobbins. The exhaust gas produced by the Diesel engine must necessarily flow through the coils because of the arrangement of the coils of ceramic fibers, and the soot particles contained in the flow of exhaust gas then stick to the ceramic fibers of the coils.

To prevent the flow of exhaust gas, which exhibits relatively very high pressure peaks, from displacing the windings in the coils, the coils must be wound relatively firmly. However, this reduces the effective surface area of the ceramic yarns used for catching the soot particles, because only those regions of the yarn that come into direct contact with the exhaust gas can participate in the soot filtering. Portions of the yarn surface that are covered by adjacent layers are ineffective.

In the known soot filter, if a break occurs in the fiber in a layer of yarn located near the outer surface, the coil loses its internal coherence and is unraveled by the flow of exhaust gas. The yarn on the coil may possibly be removed from the tube and shifted to other regions of the soot filter, where it reroutes the flow path of the exhaust gas. The regions on intact coils that are covered by the yarn material of the unraveled coil become increasingly useless in exhaust gas cleaning because of the increased flow resistance, so that a very large proportion flows through the tube of the soot filter where the filter material has been lost, because the flow resistance is relatively lowest there. Once this malfunction occurs, the soot filter is virtually ineffective any longer.

In the known arrangement of the filter material, the danger of a yarn breakage, particularly in the outer layers, is not inconsiderable. These layers are in fact set into vibration by the exhaust gas which flows highly discontinuously, and moreover major strains arise inside the coil as a result of the change in temperature in the filter material. Because of the relatively stiff winding necessary to give the coil its internal cohesiveness, changes in length resulting from temperature changes cannot be compensated for; instead, the yarn is increasingly subjected to tension.

A further difficulty in the known soot filter is that the coils have a certain tendency to come loose, because of the constant heating and cooling, which forms conduits through the filter material, through which the exhaust gas can flow without notably coming into contact with filter material.

THE INVENTION

It is an object of the invention to devise a soot filter that has improved efficiency and greater operational reliability.

According to the invention, this objected is attained by constructing the soot filter of circularly knitted mineral fibers. By using knitted fabric for the filter material, the fibers and lengths of yarn are firmly held without additional external action. Even if the yarn in one loop should break, the knitted fabric of miner fibers does not lose its internal cohesiveness. Free yarn ends produced in the vicinity of the damaged loop are firmly held by adjoining intact loops.

In the worst case, the knitted fabric may run, but this cannot impair its strength. In particular, by binding the yarn in the loops, complete raveling of the structure, as occurs with coils when the yarn in an outer layer breaks, is avoided. In the novel soot filter, it is accordingly also unnecessary to keep the yarn of the filter material at initial tension so that the body of filter material, when put into the proper form, will keep its necessary internal coherence. Because of the absence of internal strain and because the overlap coverage factor of the yarn with adjacent yarns is also lower, the effective filter surface area is larger. Finally, the knitted fabric is capable, by its intrinsic elasticity, of preventing strains from arising due to temperature changes.

Because it is embodied as knitted fabric, the cleaning action arises both when the flow through the filter material is transverse to the layers and when the exhaust gas flows in between the layers approximately parallel to them. Because of the loose packing, made possible by binding the ceramic yarn into the loops, this manner of flow through the filter becomes possible.

To attain good cleaning action, a plurality of layers can readily be disposed resting directly on one another. However, it is also possible to accommodate ceramic fibers between the layers, these fibers being in the form of woven or nonwoven fiber material, such as random fiber nonwoven, roving or roving cloth. The knitted fabric located on both sides reliably holds the essentially loose fibers between the layers firmly in place, and at the same time, because of the loose packing, maintaining good flow through them. Such an arrangement is particularly advantageous when the cost for the filter is to be reduced, because random fiber nonwoven material is less expensive to make than knitted fabric of the same volume.

Particularly, simple attachment conditions for the knitted fabric are attained if the fabric is made in tubular knitted form; in that case, a circumferentially continuous structure is obtained without further work steps, and fastening the edges becomes unnecessary. Moreover, no thickening occurs at points where edges abut one another or overlap; instead, it suffices to secure the knitted fabric to the face ends of a tubular support. The demands to be made in terms of the quality of the fastening are low. Because any open edge of the fabric has the danger of generating runs unless special precautions are taken, which make manufacture more expensive, stable multi-layer filters can be manufactured simply by folding the tubular fabric back on itself one or more times. The extensibility in the circumferential direction of the knitted fabric permits such a procedure without further precautions, which makes it possible to obtain a multi-layer structure in which there are only two open edges of the fabric. The knitted fabric is then located layer on layer in zig-zagged fashion, seen in longitudinal section.

Two fabric tubes can be used, one drawn inside the other, with the tubes spaced apart from one another. This structure can be attained simply by rolling one of the tubular knits over onto itself, from either one end or both ends, which makes it possible in a simple manner to produce a free volume that can be filled with loose fiber material. Rolling up the tubular knit onto itself is also a simple way of relatively effectively securing the unfastened edge of the fabric against running.

A two-layer endless structure can also be attained simply by joining the face ends of a tubular fabric of appropriate length by looping or binding off or the like. In this way, two-layer annular structures can be attained which, because of the intrinsic elasticity of knitted fabric, can be adapted in diameter to various support diameters.

To take into account pressure conditions inside the soot filter at the various points, the option exists of making the knitted fabric may be made with variable loop size, so that fabric having a large loop width will come into contact with those points of the filter where the back pressure is low, while filter material having small loop size is used in the filter where the back pressure is high. In this way, the filter material has a variable flow resistance in accordance with the flow conditions in the filter.

The surface area of the knitted fabric that is effective in filtering can be increased if the fabric is knitted as plush goods, either in the form of looped goods or cut-loop plush. The first type has the advantage of not needing any additional operations for cutting open the double-faced fabric, nor are any free yarn ends produced at which the yarn could begin to unravel to some extent. On the other hand, a limited raveling of the yarn at the free ends of cut-loop plush does further increase the filtering surface area, and the free ends can more easily mesh with adjacent layers, in order to further stabilize the filter body made from the fabric.

Since the yarn made up into knitted fabric is exposed for only a relatively very short distance before it intersects with an adjacent yarn length, untwisted, false-twisted and twisted yarns can be used to make the knitted fabric. In each case, the fibers contained are firmly held by the loops, which is important particularly with untwisted yarns, while such fibers furnish a very large filtering surface area.

As already noted, filter material produced in the form of tubular fabric can be secured without difficulty to tubular supports that are perforated in their tube wall. Advantageously, a flow from the outside in is used, which assures that the exhaust gas that flows through the filter material will press the filter material against the tube supporting it.

Exemplary embodiments of the subject of the invention are shown in the drawing. Shown are.

Figure 1:
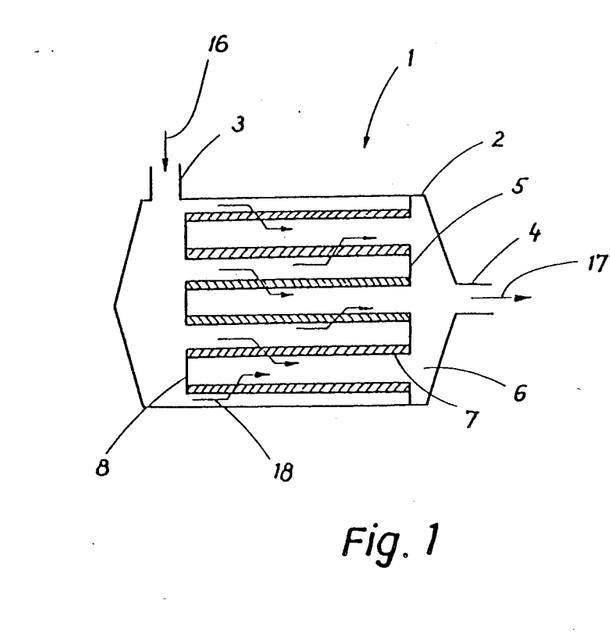
FIG. 1, a schematic soot filter according to the invention in a longitudinal section.
Figure 2:
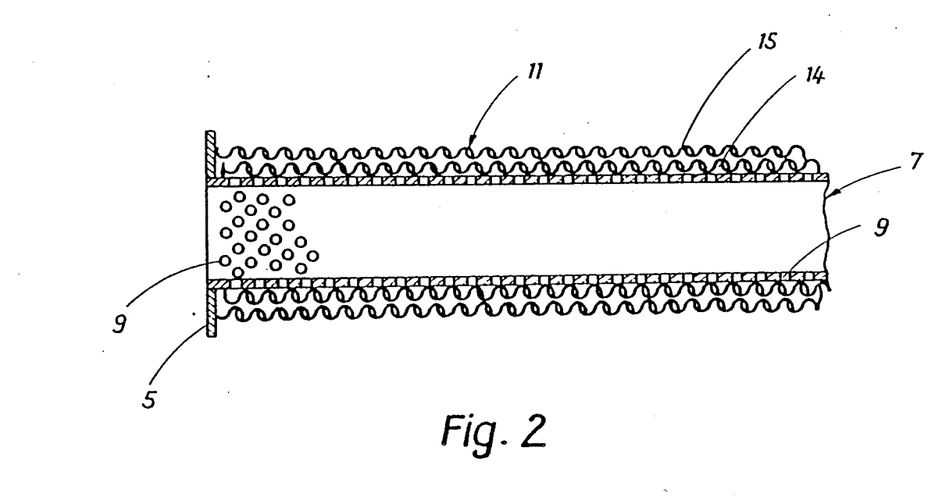
FIG. 2, one of the support tubes of the soot filter of FIG. 1, in a schematic longitudinal section.

A soot filter 1 for a compressing internal combustion engine, in particular a Diesel engine, that is to be located in the exhaust gas flow of the engine to remove soot particles from the exhaust gas is shown, highly schematically, in FIG. 1. The soot filter 1 has a container-like housing 2 closed on all sides, with an inlet pipe 3 on one side and an outlet pipe 4 on the other. Located in the interior of the container 2, in the vicinity of the outlet pipe 4, is a perforated plate 5 with a number of equidistantly distributed openings or holes 6. One tube 7 is inserted into each of the openings 6, extending from the perforated plate 5 in the direction of the inlet pipe 3 and is closed at 8, at its end remote from the perforated plate 5. The tubes 7 are secured and sealed off in the perforated plate 5 by welding or the like. As FIG. 2 shows, the wall of the tube 7 is provided with a plurality of small flow openings 9, which are equidistantly distributed over the entire wall of the tube 7 and are spatially separated from one another by a short distance.

In the interior of the housing 2, the tubes 7 extend parallel to one another and parallel to the longitudinal axis of the approximately cylindrical, container-like housing 2. They serve as holders or supports for filter material 11, which surrounds the tubes 7 in one or more layers, as long as they are provided with the openings or holes 9.

Figure 3:
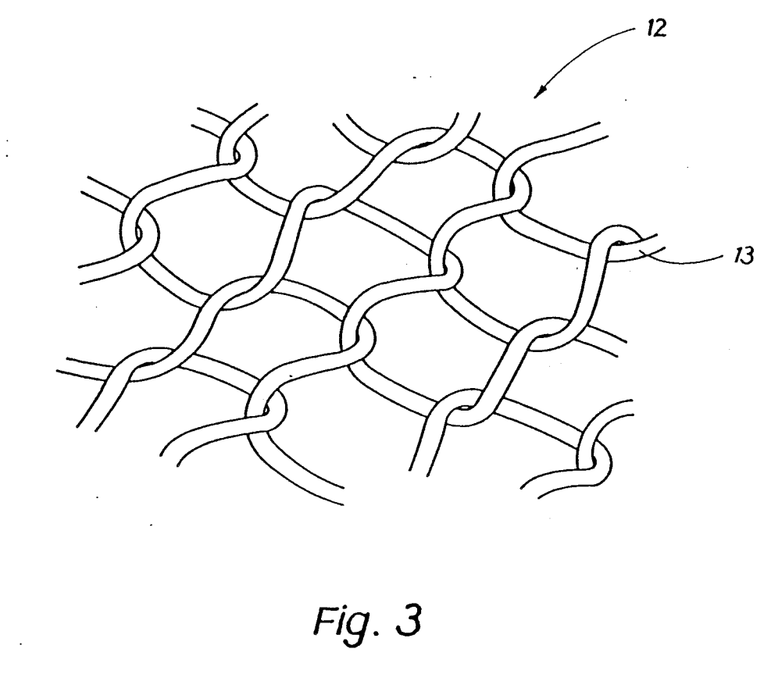
FIG. 3, a detail of the knitted fabric used for the soot filter of FIG. 1.

The filter material 11 comprises knitted fabric 12, shown in detail in FIG. 3. The knitted fabric 12 comprises one or more circular-knitted tubes of ceramic yarn 13, that has a diameter of approximately 1 mm. The ceramic yarn 13 is preferably a monofilament yarn but may also be a multifilament yarn. Depending on the intended use and requirements for strength, it is either an untwisted or twisted yarn; both false-twisted and actually-twisted yarn are possible. The material from which the filaments or fibers of the yarn 13 are made is an aluminum boron silicate comprising 62% by weight of aluminum oxide ($Al_2O_3$), 14% by weight of boron oxide ($B_2O_3$) and 24% by weight of silicon dioxide ($SiO_2$).

The construction shown in FIG. 3 is a right/left or plain fabric construction with relatively low transverse elasticity; that is, upon stretching of the fabric in the longitudinal direction, a corresponding contraction takes place transversely.

The manufacture of the soot filter 1 described thus far is accomplished such that upon a suitable circular knitting machine, an endless length of tubular knitted fabric is knitted from the ceramic yarn 13, and suitable lengths are cut off from this. The lengths obtained are pulled like stockings over the tubes 7, as many lengths as the finished layer 1 is supposed to have layers on each of the tubes 7. For the sake of simplicity, only two layers 14 and 15 are shown in FIG. 2. In an actual soot filter 1, the number of layers is much higher, however, namely 10 to 15. As soon as enough knitted tubes have been pulled onto a particular tube 7, depending on the desired number of layers 14, 15, the pulled-on knitted tubes are secured in the vicinity of the perforated plate 5 by a temperature-resistant clamp, not shown in detail, onto the outer circumference of the tube 7, while the upper end of the fabric, located at the closed end 8, is bound off with a yarn of identical material. Before the binding off, the individual knitted tubes are pulled slightly lengthwise on the tube, so that the transverse contractions that occur will cause the various layers or plies 14, 15 to rest on one another in a tightly packed manner, without generating excessively great strain. Once all the tubes 7 have been properly equipped, the thus-prepared perforated plate 5 is placed in the housing 2, and the housing 2 is closed. The exhaust gas flowing in via the inlet pipe 3 (in the direction of an arrow 16) must, in order to be able to flow through the soot filter 1, flow through the filter material 11, specifically through the loops of the knitted fabric 12 and through the holes 9 into the interior of the tubes 7, so that it can flow out through the outlet pipe 4 in the direction of an arrow 17. The flow through the filter material 11 is a flow from the outside in, schematically represented by arrows 18.

In the filter thus manufactured, the filter material 11 rests in individual layers 14, 15 or more on the outer circumference of the tubes 7, and in each layer 14, 15, because of the tubular production of the knitted fabric, a seamless layer in the circumferential direction is created is created, which coheres without particular provisions being taken, so that there are no bulges.

Even if the yarn should break in individual loops within the knitted fabric, the layers 14, 15 of the tubular knitted fabric drawn onto the corresponding tubes 7 maintain their internal coherence, because the ends of the broken region of the yarn are securely and firmly held by adjacent loops with which they are interlaced. Such yarn breakages cannot be precluded, since the yarn made of ceramic material is relatively brittle and can be set into vibration by the exhaust gas flowing past it; it is well known that, over long-term operation, such vibration can cause breakage in any materials.

The use of knitted fabric as filter material has the further advantage that even when the filter material 11 is applied loosely, the exhaust gases flowing through it cannot blow out any "conduits" through the filter material 11 in which the flow resistance would markedly drop, while on the other hand the effective filter surface area in the region of such conduits would become quite small. The yarn firmly placed at short intervals by the loops is not vulnerable to being shifted by gas flows, even though the filter material 11 is retained on the tubes 7 without internal strain. An additional strain, such as wound filter material 11 would entail, would increase the danger of yarn breakage.

In a presently preferred embodiment of the knitted fabric 12, the loop width is 5 mm and the spacing is 6 mm. In order to create a still larger effective surface in the filter material 11, the knitted fabric 12 may be knitted as plush with individual plush hooks, or as double-faced goods that are cut open later, to make cut plush.

Figure 4:
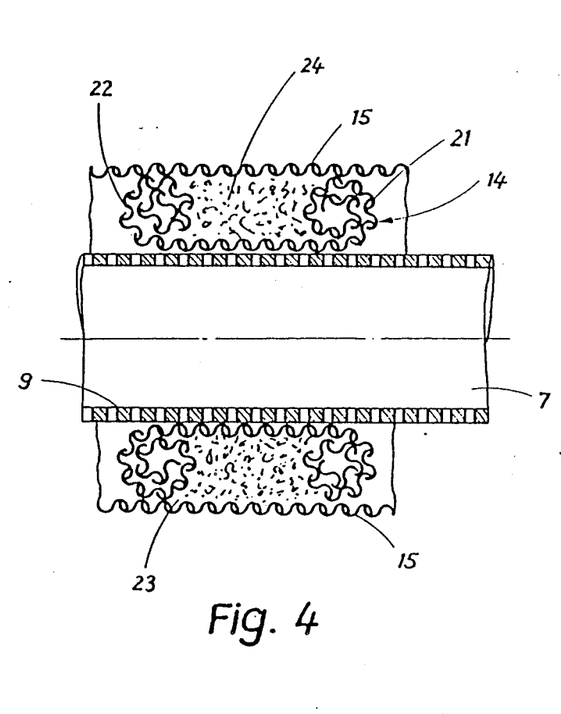
FIGS. 4–11, various ways of attaching the knitted fabric to the support tubes.
Figure 5:
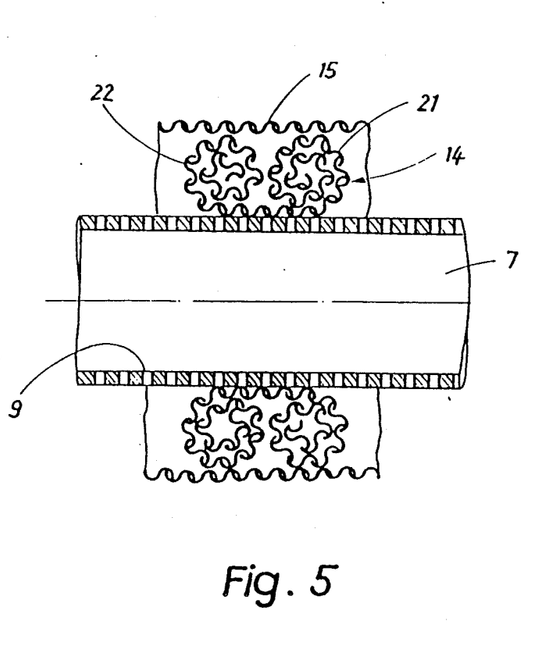

While in the exemplary embodiment described above the individual lengths of knitted tubular fabric are simply inserted coaxially in one another, producing cylindrical plies or layers parallel to one another, in the exemplary embodiment of FIGS. 4 and 5 the piece of tubular fabric 14 forming the innermost layer is rolled onto itself from its outer ends, producing two circumferentially seamless toroid rings 21 and 22. By rolling in the length of tubular fabric 14, its upper edge is protected against raveling without taking particular precautions. Moreover, the toruses or rolls 21, 22 at the same time form spacers for an other length of tubular fabric 15 slipped over it, so that if the two rolls or toruses 21, 22 are spaced apart axially from one another with respect to the tube 7, as shown in FIG. 4, a hollow space 23 is created which can be loosely filled with woven or nonwoven fiber material 24. Regardless of the form the fiber material 24 has, it is trapped between the two lengths of tubular fabric 14 and 15, and cannot be blown out by the flow of exhaust gas.

As FIG. 5 shows, the length of tubular fabric 14 may also be wound on far enough that the two toruses 21 and 22 rest directly on one another, so that one length of tubular fabric by itself produces a multi-ply structure, through which the flow of exhaust gas passes. It will be understood that both drawing figures merely show details, and that the arrangements shown there extend adjacent to one another, multiplied many times, over the entire tube 7, with only the outer tube of fabric 15 extending over the entire length, in order to securely hold the arrangement together.

Figure 6:
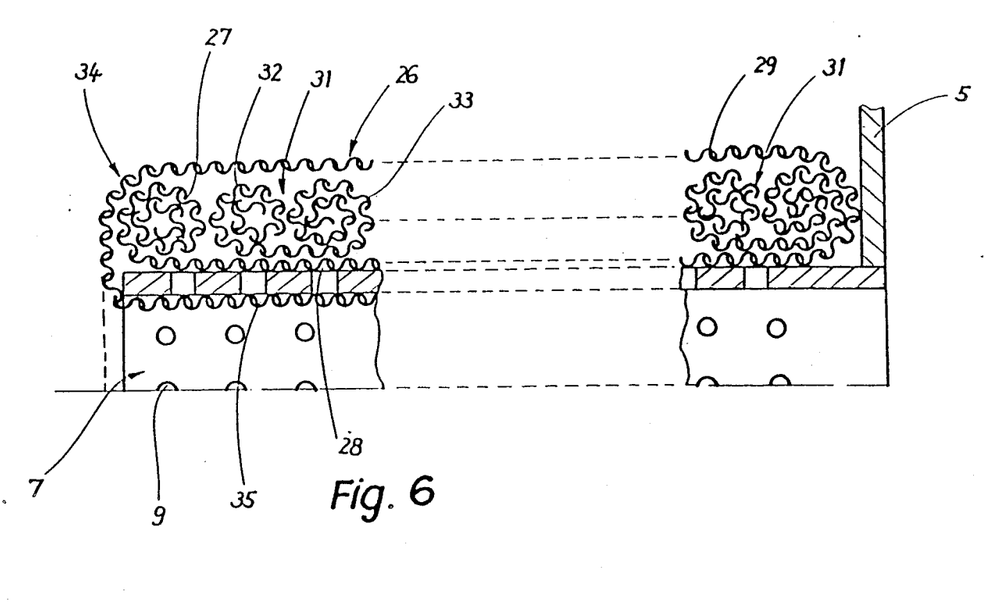

In the arrangement of FIG. 6, a first length of tubular fabric 26 is located on the tube 7 having the through holes 9; at one end, this length of tubular fabric is rolled onto itself, forming a roll 27 that is seamless in the circumferential direction. This roll 27 is located in the vicinity of the end of the tubes 7 remote from the support plate 5. From there, the length of tubular fabric 26 extends first directly over the outer circumferential surface of the tube 7 in the form of a tubular structure in the direction toward the support plate 5 shown, forming on the tube 7 a layer 28 that encloses the tube 7 on all sides along its circumference. In the vicinity of the support plate 5, the length of tubular fabric 26 is folded over to the outside by an angle of 180°, and then extends back toward the roll 27 from the support plate 5, forming a further layer 29. Further lengths of tubular fabric 31 are located beside one another on the inner layer 28, each being rolled onto themselves from their end, forming rolls 32 and 33, until the two rolls 31 and 33 of the length of tubular fabric 31 rest tightly against one another. As FIG. 6 shows, a plurality of such lengths of tubular fabric 31 are located beside one another, tightly packed, between the roll 27 of the tubular fabric 26 and the support plate 5. The wedge-shaped interspaces visible in FIG. 6 between the individual rolls 27, 32, 33 are apparent only because of the schematic illustration. In an actual embodiment, the various rolls 32, 33 are so tightly packed together that they lose their precise circular shape and in cross section, similar to FIG. 6, could hardly be distinguished from one another any longer.

In this way, the entire space between the two layers 28 and 29 that are formed by the tubular fabric 26 is filled with further rolled-up lengths of tubular fabric 31, which each form a seamless, endless structure in the circumferential direction, relative to the tube 7. They are enclosed on all sides by the lengths of tubular fabric 26.

Finally, the length of tubular fabric 26 also encompasses the roll 27 formed by it at 34. Its still-free end 35 is finally inserted into the interior of the tube for some distance as shown in highly schematic fashion. The remaining opening in the tube 7, which is lined for some distance, in the vicinity of its end remote from the support plate 5, by the length of tubular fabric 26, is finally closed by a stopper, not shown, which on the one hand effects the necessary sealing of the tube 7 at its end and on the other hand fixes the end 35.

Both in this exemplary embodiment and in the one described before it above, the exhaust gases flow through the filter material 11 and the tube 7 as a flow from the outside in; as a result, except for returning waves in the exhaust gas flow, the filter material 11 is predominantly pressed against and supported by the outer wall of the tube 7. Accordingly, the retaining forces necessary to prevent a stopper inserted into the tube 7 of FIG. 6 from being expelled by centrifugal force are not very strong. The tube 7 is not always necessary; the knitted fabric 12 can be located in the housing 45 directly, without supports or the like.

Figure 7:
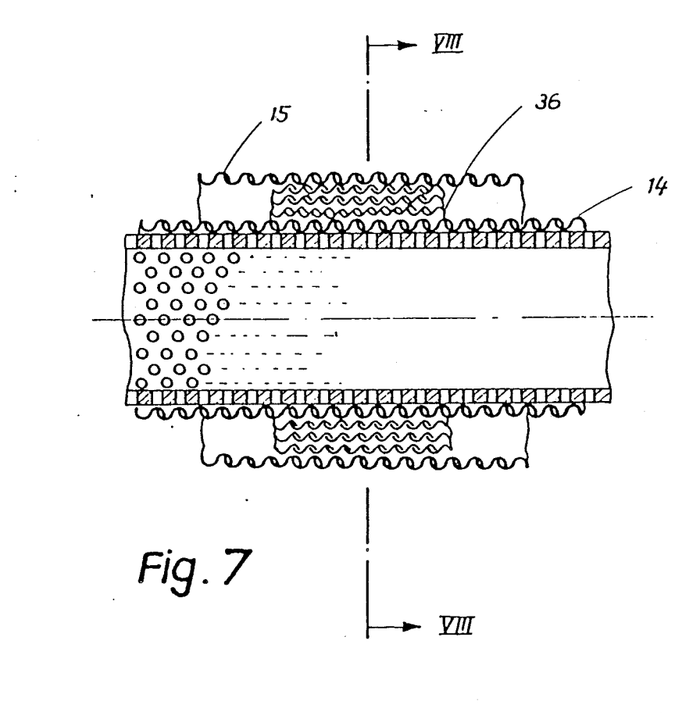
Figure 8:
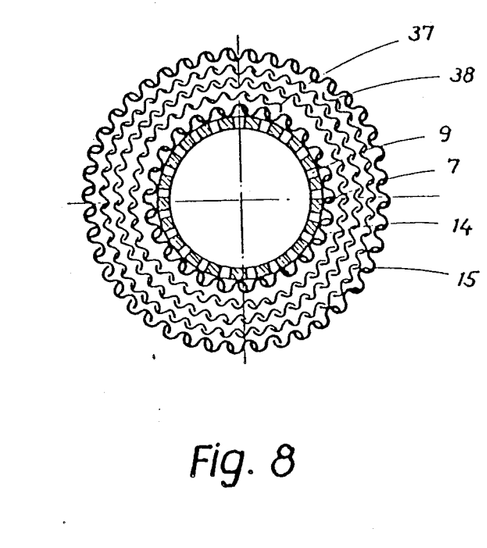

In the exemplary embodiment shown in FIGS. 7 and 8, an inner portion of tubular fabric 14 is drawn over the tube 7 and secured as explained in conjunction with FIG. 1. Onto the inner length of tubular fabric 14, a further length of knitted fabric 36 is wound circumferentially, relative to the tube 7; this piece of fabric 36 is in the form of a long strip, the width of which is equivalent to the length of the tube 7 (shown exaggeratedly short in FIG. 7, for simplicity). On the inner length if tubular fabric 14, as FIG. 8 shows, this strip of knitted fabric 36 forms a bandage or winding, which begins at 37 and the end of which can be seen at 38. Seen in cross section, the piece of knitted fabric 36 forms a multi-course spiral, in order to produce the necessary number of layers. Finally, the outer length of tubular fabric 15 is slipped onto the knitted fabric 36 wound in bandage-like fashion and secures the outer edge 38 of the knitted fabric 36. The winding formed by the knitted fabric 36 is enveloped, in the exemplary embodiment of FIG. 7, by two lengths of knitted fabric one inside the other, namely the lengths of tubular fabric 14 and 15, and protected against unraveling. The outer length of tubular fabric 15 is secured and closed in the same manner as shown in FIG. 1.

Figure 9:
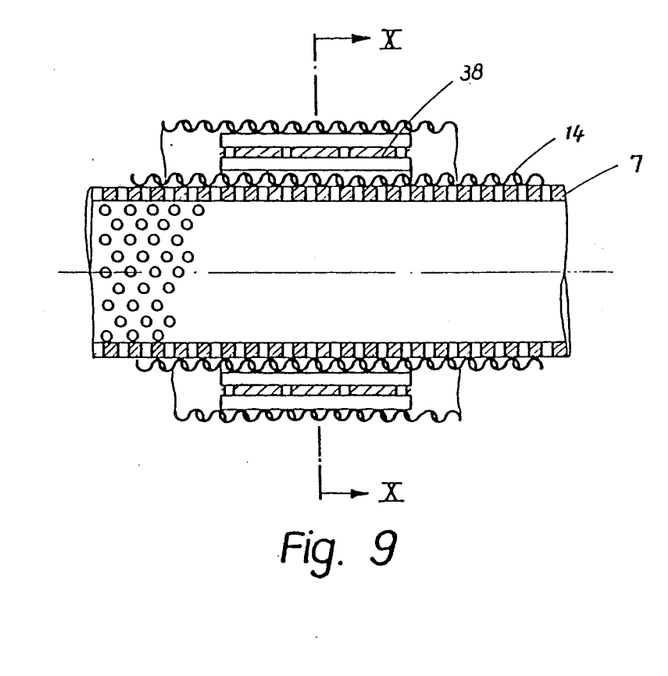
Figure 10:
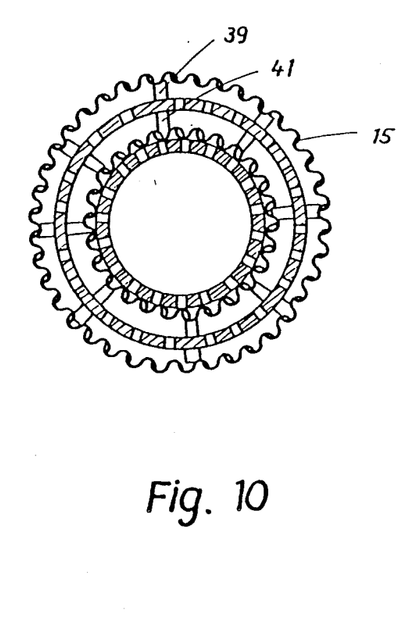

If the lengths of tubular fabric 14 and 15 or further such lengths inserted one inside the other are to be kept spaced apart from one another, then the embodiment shown in FIGS. 9 and 10 can be used. Here, over the inner length of tubular fabric 14 resting directly on the tube 7, a length of tubular fabric 38 knitted of wire is placed, with plush loops 39 and 41 protruding from it to both sides, that is, protruding radially outward and radially inward. With the radially inward plush loops 41, the knitted wire structure 38 is supported on the inner length of tubular fabric 14 knitted from ceramic fibers, while the plush loops 39 protruding radially outward from the knitted wire fabric 38 form support surfaces for the length of tubular fabric 15 of ceramic material located radially farther outward. The two lengths of tubular fabric 14 and 15 shown are radially held at a suitable predetermined distance from one another by the length of tubular fabric knitted from wire, which is hence intrinsically dimensionally rigid.

While the flow through the knitted fabric performing the filtering is substantially transverse to the fabric in the exemplary embodiments of FIGS. 2 and 7-10, a flow through adjacent layers takes place in the exemplary embodiments of FIGS. 4-6. In the vicinity of the rolls, which in practice are tightly packed together, regions of the roll occur in which the knitted fabric forming the filter material 11 extend approximately in radial planes, so that the flow, occurring as a radial flow from the outside in, must necessarily flow in between adjacent plies or layers of knitted fabric.

Figure 11:
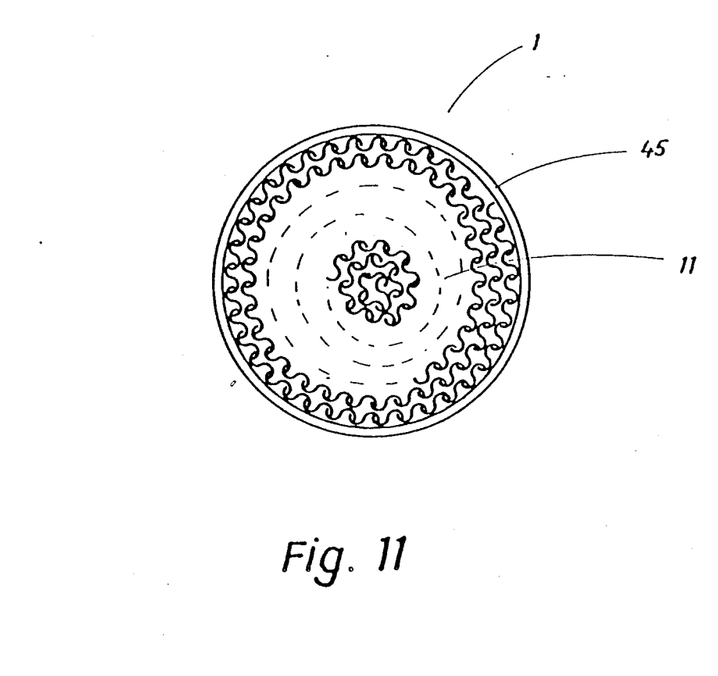

In the exemplary embodiment of the soot filter 1 of FIG. 11, a cylindrical tubular housing 45 is provided, which is closed at both face ends and provided with inlet and outlet pipes. The filter material 11 contained in the housing 45, as before, comprises the knitted fabric shown in FIG. 3; as FIG. 11 shows, the fabric are wound in a spiral to make a roll, and the outer diameter of the resulting roll of knitted fabric is equivalent to the inside diameter of the housing 45. The length of the roll is dimensioned such that it is readily accommodated in the housing 45.

In this embodiment, the exhaust gas to be filtered flows through the spirally wound knitted fabric parallel to the layers, which are located approximately concentrically within one another. The interior inside the resultant roll of knitted fabric is completely filled as well, preventing the formation of any continuous conduit that would have lesser flow resistance than in the surrounding regions.

I claim:

1. A soot filter (1) disposed in the exhaust gas flow of an internal combustion engine, in particular an air-compressing internal combustion engine, the soot filter having a housing (2) having an inflow pipe and an outflow pipe (3, 4) for the exhaust gas flow, and filter material (11) located in the housing (2) positioned in the path of flow, the filter material (11) comprises at least one layer (14, 15), of circularly knitted fabric (12) essentially consisting of ceramic.

2. The soot filter of claim 1, wherein the knitted fabric (12) is located in the housing (2) in the path of the exhaust gas flow between the inflow pipe (3) and the outflow pipe (4) such that the path of the exhaust gas flow is through or transversely to the at least one layer of filter material.

3. The soot filter of claim 1, wherein the knitted fabric (12) forms a plurality of plies or layers (21, 22, 27, 31, 32); and
   the path of the exhaust gas flow in the housing (2) is such that the exhaust gas flows parallel to said plies or layers of the filter material.

4. The soot filter of claim 1, wherein at least two layers (14, 15) are provided, said layers being located spaced apart from one another, defining an interspace, and woven or non-woven fiber material (24) located in the interspace (23) between said layers.

5. The soot filter of claim 1, wherein said at least one layer of filter material is essentially in cylindrical form and defines cylindrical inner and outer surfaces.

6. The soot filter of claim 1, wherein the filter material comprises at least two layers, said two layers including a length of tubular fabric (14, 15, 31) folded back over onto itself to form said at least two layers.

7. The soot filter of claim 1, wherein the filter material comprises a plurality of layers, said plurality of layers being formed by a unitary length of tubular fabric (14) folded back onto itself a plurality of times;
   and wherein the reversal or fold lines of said layers are axially spaced from each other such that the knitted fabric (12) extends in approximately tubular or cylindrical form between the bends formed by the reversal or fold lines.

8. The soot filter of claim 1, wherein said at least one layer of tubular fabric defines face ends, said face ends being connected by binding off or looping to form an endless tubular ring.

9. The soot filter of claim 1, wherein said circularly knitted fabric (12) is knitted with variable loop size.

10. The soot filter of claim 1, wherein said mineral yarns comprise ceramic fibers.

11. The soot filter of claim 1, wherein said mineral yarns (13) of the knitted fabric (12) comprise at least one of: untwisted yarn; false twisted yarns; twisted yarns.

12. The soot filter of claim 1, further including a support (5, 7) defining a support tube, formed with perforations (7) therein, and an apertured tube wall closing off said tube; and
   said at least one layer of circularly knitted fabric being fitted over a surface of said tubular support and extending at least over the region formed with said apertures or perforations (7) to provide for flow of exhaust gases through the knitted fabric.

13. The soot filter of claim 1, further including a support means (5, 7), said circularly knitted fabric (12) being placed on a surface exposed to exhaust gas flow from the inflow pipe whereby, upon gas pressure due to gas flow through the knitted fabric, the knitted fabric will be pressed against the support means.

14. The soot filter of claim 1, wherein at least two layers (14, 15) are provided, each having essentially cylindrical form and located approximately coaxially with respect to one another;

and knitted fabric (36) located between said at least two layers, said knitted fabric (36) between said at least two layers, said enclosed knitted fabric being wound circumferentially, with respect to the nested at least two layers (14, 15).

15. The soot filter of claim 1, wherein the knitted fabric (12) is directly positioned within the housing devoid of support along its length.

16. The soot filter of claim 17, wherein said ceramic yarns comprise ceramic fibers.

17. The soot filter of claim 1, wherein at least two plies or layers (14, 15) of knitted filter material are provided, said plies or layers being positioned one above the other.

18. The soot filter of claim 1, wherein said filter material comprises a multilayer structure; and at least one of: the outer layer; the inner layer is formed of said circularly knitted fabric (12) consisting essentially of mineral yarn.

19. The soot filter of claim 1, wherein the tubular fabric is rolled onto itself from at least one end thereof to form a toroid.

20. The soot filter of claim 19, further including an individual element of tubular circularly knitted fabric forming one of said layers, and fitted over a first layer of tubular fabric, wherein said first layer of tubular fabric includes said toroid.

21. The soot filter of claim 1, wherein the tubular fabric is rolled onto itself from both ends, forming two endless toroids (21, 22, 32, 33) along its outer circumference.

22. The soot filter of claim 21, wherein said two toroids (21, 22) are axially spaced apart from each other.

23. The soot filter of claim 21, wherein said two toroids (21, 22, 32, 33) are positioned adjacent each other.

24. The soot filter of claim 23, wherein said circularly knitted fabric is knitted to form a plush fabric.

25. The soot filter of claim 1, wherein at least two layers (14, 15) of said knitted fabric (12) are provided, each having approximately cylindrical shape, and positioned one within another, and spaced radially apart;

and spacer means (38) located in the interspace between said two layers (14, 15) to maintain said two layers in spaced-apart position.

26. The soot filter of claim 25, wherein said spacer means comprises a wire spacer formed of tubular wire knitted fabric formed with projecting plush loops (39, 41) for spacing said two layers of circularly knitted fabric (12) apart.

* * * * *